(12) United States Patent
Palmer (10) Patent No.: US 10,404,587 B2
(45) Date of Patent: *Sep. 3, 2019

(54) SYSTEMS AND METHODS FOR PACKET ROUTING

(71) Applicant: Friday Harbor LLC, New York, NY (US)

(72) Inventor: Douglas A. Palmer, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/131,445

(22) Filed: Apr. 18, 2016

(65) Prior Publication Data

US 2016/0234111 A1 Aug. 11, 2016

Related U.S. Application Data

(63) Continuation of application No. 13/749,402, filed on Jan. 24, 2013, now Pat. No. 9,350,656.

(51) Int. Cl.
*H04L 12/741* (2013.01)
*H04L 29/06* (2006.01)

(52) U.S. Cl.
CPC .............. *H04L 45/74* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,647,428 B1 * | 11/2003 | Bannai | H04L 29/12009 370/253 |
| 7,016,352 B1 | 3/2006 | Chow et al. | |
| 8,189,496 B2 | 5/2012 | Wittenschlaeger | |
| 8,189,576 B2 | 5/2012 | Ferguson et al. | |
| 8,228,818 B2 | 7/2012 | Chase et al. | |
| 8,228,929 B2 | 7/2012 | Aybay et al. | |
| 8,713,305 B2 | 4/2014 | Liu et al. | |
| 8,782,178 B2 | 7/2014 | Rosenberg | |
| 2009/0122724 A1 | 5/2009 | Rosenberg | |
| 2009/0190580 A1 | 7/2009 | Kailasam et al. | |
| 2009/0316619 A1 * | 12/2009 | Wittenschlaeger | H04B 7/19 370/316 |
| 2010/0106866 A1 * | 4/2010 | Aybay | H04L 47/10 710/29 |
| 2014/0032457 A1 | 1/2014 | Palmer et al. | |

OTHER PUBLICATIONS

International Search Report dated May 14, 2014, in International Patent Application No. PCT/US14/12881.

* cited by examiner

*Primary Examiner* — Jason E Mattis
*Assistant Examiner* — Hong Shao
(74) *Attorney, Agent, or Firm* — Sheppard Mullin Richter & Hampton LLP (57) ABSTRACT

Systems and methods to route packets of information within an integrated circuit, across one or more boards, racks, blades, and/or chassis, and/or across a connected network of packet processing engines include various modes of operation. Packets are routed to their destination, for example an individual packet processing engine. The packets of information include address-mode indicators, one or more destination port indicators, and/or (long-distance) addresses.

17 Claims, 5 Drawing Sheets

SYSTEMS AND METHODS FOR PACKET ROUTING

CROSS-REFERENCE TO RELATED APPLICATIONS

The present application is a continuation of U.S. patent application Ser. No. 13/749,402, filed Jan. 24, 2013, entitled "Systems and Methods for Packet Routing," which is incorporated herein by reference in its entirety.

FIELD OF THE INVENTION

The disclosure relates to packet routing, and in particular to routing schemes that enable fast and efficient routing within hyper-connected networks of packet processing engines.

BACKGROUND OF THE INVENTION

Information-processing systems that process electronic information commonly use electronic storage to store electronic information, digital processors to process the stored electronic information, and busses, networks, or other logic to connect such electronic storage to such digital processors. Electronic information is commonly sent or transmitted by a source (or "origin") and received by one or more destinations. For example, the sources may include electronic storage. For example, the destinations may include the digital processors.

Information-processing systems commonly distinguish "write" operations from "read" operations, wherein write operations may be used to store information, e.g. in electronic storage, and wherein read operations may be used to retrieve information, e.g. for use by a processor. Generally, transfers include electronic information being moved from one component to another. Write operations and/or read operations may include transfers.

In information-processing systems having more complicated topologies, hierarchies, and/or architectures, individual read and write operations may selectively be associated with one of multiple sources and/or destinations. In some cases, individual operations may be associated with multiple sources and/or destinations. For example, in information-processing systems having one or more busses to connect multiple destinations, one or more appropriate destinations may be distinguished from one or more inappropriate destinations by various means of disambiguation, such as the use of addresses. Based on the address, a read or write operation may be guided to and/or from a particular source and/or a particular destination.

SUMMARY

One aspect of the disclosure relates to a system and method of routing packets of information. As used herein, the term "information" may include "electronic information" and/or "digital information." The routing system may include one or more packet processing engines, one or more connections, one or more routers, and/or other components. Individual packet processing engines may include one or more ports. Individual routers may include one or more ports. Connections may include physical, direct, and/or point-to-point connections, for example between ports of different components of the routing system.

The routing system and/or its constituent components may include electronic storage to store packets of information, in particular non-transitive electronic storage, for example one or more memory banks. As used herein, the term "memory bank" may refer to RAM, SRAM, DRAM, eDRAM, SDRAM, volatile memory, non-volatile memory, and/or other types of electronic memory. The storage capacity of the electronic storage may range from a few kilobytes to a few thousand petabytes, and/or any capacity in-between.

A packet of information may be a predetermined quantity of electronic information, albeit potentially a variable quantity, being arranged, organized, and/or formatted in a predetermined manner. As used herein, the terms "packet of information" and "packet" may be used interchangeably. Packets may be transferred and/or processed autonomously, e.g. independently from other packets.

Packet-based communication may be used in networks, such as, by way of example, the Internet, for various reasons. Decentralized networks may include multiple paths between sources and destinations. Originally based on queuing theory, packet-switching can be used to provide distributed, scalable, and robust communications, even in the presence of intermittent connectivity, long transmission delays, variable and/or high error rates, and/or other unfavorable operating conditions that may occur in networks. Similar conditions may not commonly be associated with on-chip communication (or communication within the components of a printed circuit board, rack, blade, or chassis). For example, communication within a chip or integrated circuit may not include multiple paths between sources and destination. Such a communication chip commonly may not suffer from intermittent connectivity, long transmission delays, variable and/or high error rates, and/or other unfavorable operating conditions that may occur in networks. For these and other reasons, on-chip communication (or communication within the components of a printed circuit board, rack, blade, or chassis) may usually be based on other types of connections/topologies than communication within a (distributed) network. On-chip topologies may include one or more of point-to-point topologies, bus topologies, star topologies, tree topologies, and/or other topologies.

Communication within a chip (or communication within the components of a printed circuit board, rack, blade, or chassis), regardless of topology, may commonly not be based on packets. In the systems described herein, packets of information may be a convenient quantity and/or format for information processing purposes, in particular for neural processing. By virtue of standardizing and/or matching the units of information used for the purposes of storage and/or transfer with the units of information used for the purpose of information processing, i.e. packets, the systems as described herein may be more efficient, simple, flexible, scalable, and/or otherwise preferred over similar systems that suffer from a proliferation of different types of connections, different protocols, different interfaces, different formats for communications, different units of information, and/or the problems in conversions, design, and/or verification associated such a proliferation. As used herein, the term "processing" for a packet may be referred to as "consuming" a packet. Packets may not be processed until they have reached their destination.

Individual packets of information may include a packet header. Packets and/or packet headers may include information and/or sets of values. The information and/or sets of values may include one or more of fields, operands, operator codes, address-mode indicators, source addresses, destination addresses, destination port indicators, and/or other information or values. Individual packets of information may include a packet payload, which may include a variable quantity of electronic information. In some implementations, packets may be in accordance with a proprietary protocol. Packets may be referred to as flit packets. Individual packets may range between a minimum bit size and a maximum bit size. The minimum bit size may be 32 bits, 64 bits, 128 bits, 256 bits, and/or another suitable minimum bit size. The maximum bit size may be 512 bits, 1024 bits, 2048 bits, 4096 bits, 8192 bits, and/or another suitable maximum bit size. For example, in some implementations, packets may range between 64 bits and 2048 bits.

A packet header may include, by way of non-limiting example, an address-mode indicator, one or more destination port indicators, and/or one or more addresses. An address-mode indicator may indicate which mode of operation is to be used to route a particular packet. Routing modes and/or routing schemes may include port-by-port routing, (relative or absolute) address-based routing, and/or other types of routing. Destination port indicators may indicate a port as a destination for a particular packet. Address-based routing and port-by-port routing may encode information in the same fields and/or bits within a packet header. Using the same fields and/or bits within a packet header to support multiple modes of routing may be referred to as hybrid routing. The address-mode indicator may be used to distinguish the proper routing mode and/or routing scheme for a particular packet.

Packet processing engines may be configured to generate, receive, transmit, and/or process packets. Packet processing engines may be configured to route incoming packets to other packet processing engines and/or destinations as appropriate. In some embodiments, generation of one or more output packets may be responsive to receiving one or more packets. Output packets may be generated by processing one or more received packets. Output packets may have similar characteristics and/or formatting as the packets described elsewhere herein. For example, output packets may include an output packet header, an output packet payload, etc. Packet processing engines may analyze and/or inspect a packet of information to determine whether to transmit and/or to process it. Packet processing engines may be configured to route packets. For example, a packet processing engine may receive a packet, determine through which port to transmit the packet, and transmit the packet through the determined port to a (possibly intermediate) destination. For example, a packet processing engine may receive a packet, determine that the packet has reached its destination, and process and/or consume the packet.

Routers may be configured to receive and/or transmit packets of information. Routers may include one or more address tables. Routers may be configured to determine destinations for packets based on one or more address tables and/or information in the packet. For example, a destination may be determined based on an address in a packet header. Routers may be configured to support address resolution of addresses in packet headers. In some implementations, a destination may be determined based on one or more comparisons between entries in an address table and an address included in a packet.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
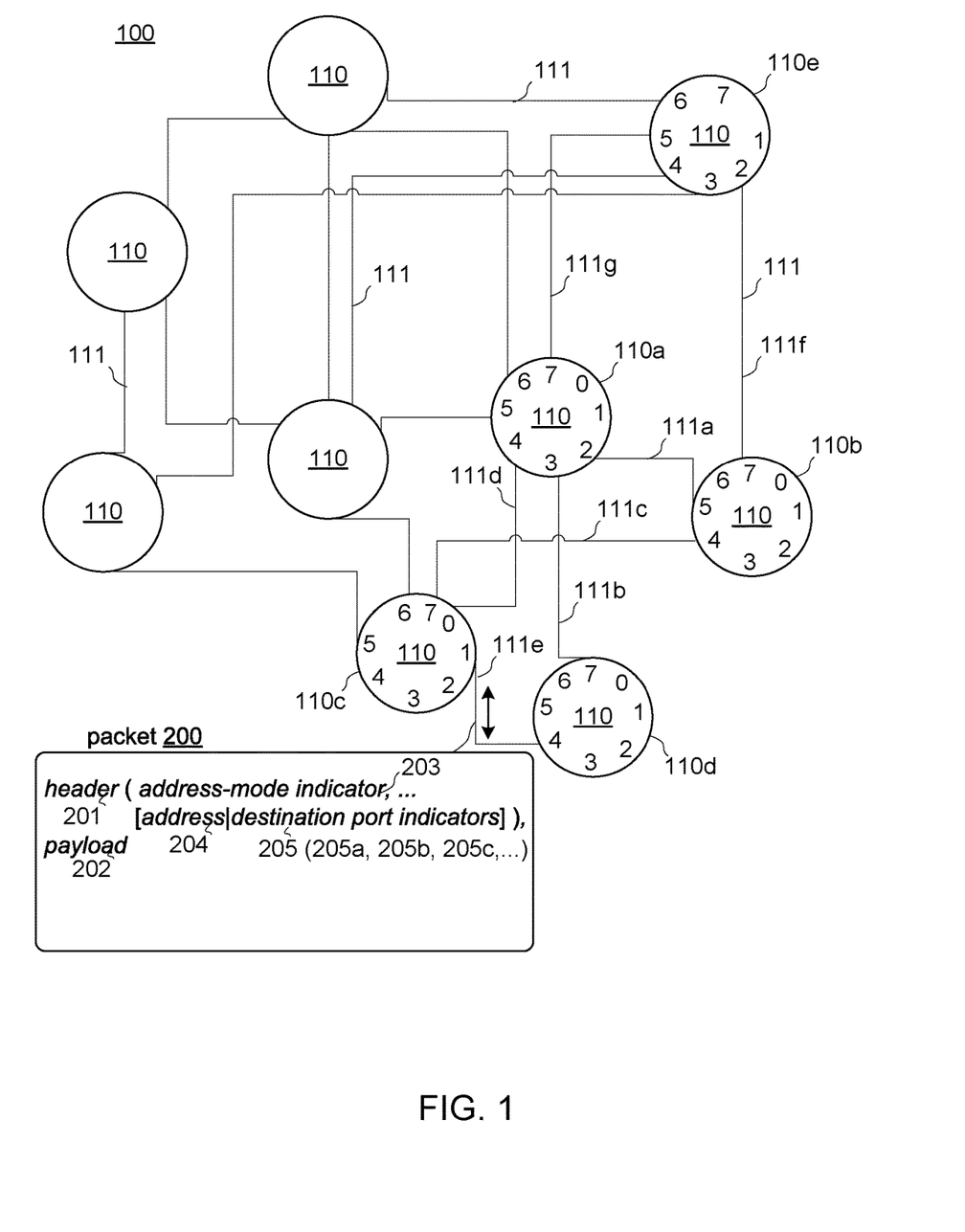
FIG. 1 illustrates a routing system in accordance with one or more embodiments.

FIG. 1 illustrates a routing system 100. Routing system 100 may interchangeably be referred to as system 100 or information-processing system 100. System 100 may include one or more packet processing engines 110, one or more connections 111, one or more routers 120 (not shown in FIG. 1), electronic storage (not shown in FIG. 1), one or more external interfaces 121 (not shown in FIG. 1), and/or other components. In some implementations, individual packet processing engines may be implemented in a single chip or integrated circuit. In some implementations, system 100 may be implemented in a single chip or integrated circuit. In some implementations, system 100 may be implemented in a single rack, blade, and/or chassis.

As depicted in FIG. 1, system 100 may include multiple individual packet processing engines, including one or more of a packet processing engine 110a, a packet processing engine 110b, a packet processing engine 110c, a packet processing engine 110d, a packet processing engine 110e, and/or other packet processing engines. Individual packet processing engines may include one or more ports configured to transmit and/or receive information. For example, as depicted in FIG. 1, a packet processing engine 110 may include 8 ports (labeled e.g. from 0 to 7). In some implementations, packet processing engines may include anywhere from 2 to 32 ports. In some implementations, ports may be labeled from 1 onwards, e.g. in case port value zero is used to indicate that a packet has reached its destination and may thus be processed and/or consumed. In some implementations, if packet processing engines include more ports, e.g. between 16 and 32 ports, destination port indicators would need to use a corresponding increased bit-width to distinguish between ports (and the value that indicates a packet has reached its destination).

Connections may include physical, direct, and/or point-to-point connections, for example between ports of different components of system 100. System 100 may include a set of connections 111, including one or more of a connection 111a, a connection 111b, a connection 111c, a connection 111d, a connection 111e, a connection 111f, a connection 111g, and/or other connections. For example, as depicted in FIG. 1, connection 111a connects port 2 of packet processing engine 110a to port 5 of packet processing engine 110b. For example, as depicted in FIG. 1, connection 111b connects port 3 of packet processing engine 110a to port 7 of packet processing engine 110d. Connections may include a data bus having a width of 32 bits, 64 bits, 128 bits, and/or another suitable width for a data bus.

Packet processing engines may have as many connections as ports, e.g., in some implementations, 8 ports. System 100 may be referred to as including a hyper-connected network of packet processing engines. In some implementations, system 100 may be more sparsely connected, e.g. such that some packet processing engines have fewer connections than ports. System 100 may typically include more than 8 packet processing engines, e.g. 16, 32, 64, 128, 192, and/or another suitable number of packet processing engines. If system 100 includes more packet processing engines than the number of ports for an individual packet processing engine (or more than this number plus one), it necessarily means not all packet processing engines are directly connected to all other packet processing engines. In such a system, packets may be routed via one or more intermediate packet processing engines prior to arriving at the intended destination. In some implementations, multiple systems that are the same as or similar to system 100 may operate in combination. In such a combined system of systems, packets may be routed between a packet processing engine of a first system 100 and a packet processing engine of a second system 100.

In some implementations, packet processing engine 110 may include one or more clusters that are the same as or similar to the system for neural processing (e.g. "system 200", also referred to as "group 200" and including multiple neural processing engines 220) described in U.S. patent application Ser. No. 13/560,890, filed Jul. 27, 2012, and entitled "NEURAL PROCESSING ENGINE AND ARCHITECTURE USING THE SAME", which is hereby incorporated by reference in its entirety into the present disclosure. This application may be referred to as "the '890 application" herein. For example, an individual packet processing engine 110 may include 8 such clusters ("system 200" in the '890 application) of 32 neural processing engines each (e.g. "neural processing engine 220" in the '890 application), or, in other words, 256 neural processing engines per individual packet processing engine. Note that these specific pluralities are exemplary and not intended to be limiting in any way.

In some implementations, packet processing engine 110 may include one or more components that are the same as or similar to the components of the on-chip processing system (e.g. "system 100") described in U.S. patent application Ser. No. 13/705,999, filed Dec. 5, 2012, and entitled "SMART MEMORY", which is hereby incorporated by reference in its entirety into the present disclosure. This application may be referred to as "the '999 application" herein.

In some implementations, packet processing engine 110 may be included in a system that may operate in conjunction with a processing system that is the same as or similar to the on-chip processing system (e.g., "system 100") described in U.S. patent application Ser. No. 13/749,558, filed Jan. 24, 2013, and entitled "I/O DATA INTERFACE FOR PACKET PROCESSORS", which is hereby incorporated in its entirety into the present disclosure. This application may be referred to as "the 558 application" herein.

System 100 may be configured to store, transfer, and/or process packets of information. As used herein, packets of information may include information that comprises bits (e.g. a single one or zero) and/or bytes (e.g. eight bits) of information. It is noted that this disclosure is not limited to binary logic or binary information, even though the examples herein may assume so.

A packet of information may be a predetermined quantity of electronic information, albeit potentially a variable quantity, being arranged, organized, and/or formatted in a predetermined manner. Packets may be transferred and/or processed autonomously, e.g. independently from other packets. Individual packets of information may include a packet header. Packets and/or packet headers may include information and/or sets of values. The information and/or sets of values may include one or more of fields, operands, operator codes, address-mode indicators, source addresses, destination addresses, destination port indicators, and/or other information or values. A field and/or operator code may include one or more bits of information that specifies and/or may be used to select one or more operations to be performed, e.g. on the packet payload.

Packet headers may adhere to one or more predetermined formats for arranging and/or ordering one or more fields and/or one or more operator codes. For example, the size of the packet header may be a fixed number of bits or bytes. Alternatively, and/or simultaneously, the size of a packet header may be a variable number of bits or bytes, though the particular size may be indicated in some cases by a field within the packet header. The size of the packet payload may be a fixed number of bits or bytes. Alternatively, and/or simultaneously, the size of a packet payload may be a variable number of bits or bytes, though the particular size may be indicated in some cases by a field within the packet header.

A packet header may include, by way of non-limiting example, an address-mode indicator, one or more destination port indicators, and/or one or more addresses. An address-mode indicator may indicate which mode of operation is to be used to route a particular packet. Routing modes and/or routing schemes may include port-by-port routing, (relative or absolute) address-based routing, and/or other types of routing. Destination port indicators may indicate a port as a destination for a particular packet. As used in this context, the destination may be the final destination of a particular packet or the immediate destination that is intended to be reached from the current packet processing engine that is inspecting the particular packet. Address-based routing and port-by-port routing may encode information in the same fields and/or bits within a packet header. The address-mode indicator may be used to distinguish the proper routing mode and/or routing scheme for a particular packet. As depicted in FIG. 1, a packet 200 may include a header 201, a payload 202, an address-mode indicator 203, an address 204, one or more destination port indicators 205, and/or other information. The one or more destination port indicators may include a first destination port indicator 205a, a second destination port indicator 205b, and/or other destination port indicators. In some implementations, address 204 may be mutually exclusive with the one or more destination port indicators 205. For example, this information may use the same bits in header 201. The one or more destination port indicators may be used to indicate the immediate destination that is intended to be reached from the current packet processing engine that is inspecting the particular packet. Some information in header 201 may be interpreted to indicate whether the particular packet has reached its final destination, e.g. a packet processing engine intended to perform final processing on the particular packet. In some implementations, such information may be encoded in one or more (or all) destination port indicators 205.

Packet processing engines 110 may be configured to generate, receive, transmit, and/or process packets. In some embodiments, generation of one or more output packets may be responsive to receiving one or more packets. Output packets may be generated by processing one or more received packets. Output packets may have similar characteristics and/or formatting as the packets described elsewhere herein. For example, output packets may include an output packet header, an output packet payload, etc. Packet processing engines may analyze and/or inspect a packet of information to determine whether to transmit and/or to process it.

Packet processing engines 110 may be configured to route packets. For example, a packet processing engine may receive a packet, determine through which port to transmit the packet, and transmit the packet through the determined port to an intermediate or final destination. Packet processing engine 110 may be configured to use one or more routing modes to route packets. Exemplary routing modes may include port-by-port routing, address-based routing, and/or other routing modes.

For example, in port-by-port routing, a particular packet processing engine 110 may be configured to determine whether an incoming packet is intended to be processed by that particular packet processing engine or, alternatively, where to route the incoming packet. Port-by-port routing may be analogous to turn-by-turn directions to reach a destination. Packets may originate at a packet source. Packet sources may include individual packet processing engines 110, electronic storage, and/or other sources of packets. For example, a packet processing engine may create and/or generate a packet, which subsequently may need to be routed to its destination. For a packet processing engine, the immediate destination of a packet may be selected from a limited set of alternatives. For example, the destination may be selected from one of the ports of the particular packet processing engine 110.

To illustrate port-by-port routing, assume that packet processing engine 110a receives a packet 200 that includes, in header 201, at least one destination port indicator 205a. Assume that the value of destination port indicator 205a is 2. Assume that packet processing engine 110a is included in system 100 as depicted in FIG. 1. Assume that a value between 0 and 7 for destination port indicator 205a indicates that the destination of packet 200 is the packet processing engine connected to the port of packet processing engine 110a that matches the value of destination port indicator 205a. Assume that any other value for destination port indicator 205a indicates that the current packet processing engine 110, here packet processing engine 110a, is the destination of packet 200. Packet processing engine 110a may be configured to determine, by inspecting destination port indicator 205a, whether packet processing engine 110a is the destination of packet 200 or not. In this example, packet processing engine 110a is not the destination of packet 200. Subsequently, packet processing engine 110a may be configured to determine, by inspecting destination port indicator 205a, which of the ports of packet processing engine 110a is intended as destination for transmission of packet 200. In this example, the intended port as destination for packet 200 is port 2. As depicted in FIG. 1, port 2 of packet processing engine 110a is connected, via connection 111a, to packet processing engine 110b.

Subsequently, packet processing engine 110a may be configured to modify, for example by bit-shifting the one or more destination port indicators 205 in the appropriate field of header 201, one or more destination port indicators 205. Destination port indicators 205 may be modified according to a predetermined standard operation on one or more particular fields of header 201. In particular, the value of destination port indicator 205a may be modified to be not in the range between 0 and 7. Subsequently, packet processing engine 110a may be configured to transmit the modified packet 200 via the indicated port 2, and thus via connection 111a, to packet processing engine 110b. Upon receiving modified packet 200, packet processing engine 110b may be configured to determine whether the one or more destination port indicators 205 indicate that the destination of the received modified packet 200 is the current packet processing engine, here packet processing engine 110b. In particular, the value of destination port indicator 205a may now confirm that packet 200 has reached its destination. Packet processing engine 110b may be configured to process packet 200 in a manner similar to the processing described as being performed by the system for neural processing in the '890 application. The values of any destination port indicators, the interpretation of those values, the number of ports per packet processing engine, the manner in which some information of header 200 is modified, and/or the manner in which the contents of header 201 is used and/or interpreted to indicate that the destination for packet 200 is reached are intended to be exemplary and not limiting in any way. For example, a separate field in header 201 could be toggled to indicate whether the next receiving packet processing engine 110 within system 100 is intended as the destination.

The preceding example of port-by-port routing in system 100 describes the use of one intermediate packet processing engine 110, here packet processing engine 110a. The number of intermediate packet processing engines in the transfer of a packet to its final destination is not intended to be limited by this example. For another port-by-port routing example, assume that, in system 100 as depicted in FIG. 1, packet processing engine 110d receives a packet 200 that is intended to reach, as final destination, packet processing engine 110e. No direct connection may be available to accomplish such a transfer. Assume that each of three destination port indicators 205 in header 201 is encoded using 4 bits that are interpreted in a manner similar to the interpretation of the preceding port-by-port routing example. The value of the three destination port indicators 205 is represented by a tuple [x, y, z] for destination port indicators 205a, 205b, and 205c, respectively, wherein x, y, and z each have a value between 0 and 15. Destination port indicator 205c may be referred to as the bottom destination port indicator. Accordingly, such a tuple may be encoded using 12 bits. Note that these 12 bits potentially allow routing to reach 8*8*8=512 destinations. A tuple of 24 bits potentially allow routing to reach $8^6$=262,144 destinations.

At the start of routing packet 200, its tuple may have value [15, 7, 7]. Packet processing engine 110d may be configured to determine whether the bottom destination port indicator indicates that packet 200 has reached its destination. The value 7 indicates the packet has not reached its destination yet. Instead, the immediate destination packet processing engine can be reached via port 7, and thus connection 111b, of packet processing engine 110d, which is connected to packet processing engine 110a. Prior to transmission, packet processing engine 110d modifies the tuple by right-shifting its 12 bits by 4 bit-positions (and inserting 1s from the left to indicate no value from 0 to 7). Accordingly, the tuple now has value [15, 15, 7] when packet 200 is received by packet processing engine 110a.

Packet processing engine 110a may be configured to determine whether the bottom destination port indicator indicates that packet 200 has reached its destination. The value 7 indicates the packet has not reached its destination yet. Instead, the immediate destination packet processing engine can be reached via port 7, and thus connection 111g, of packet processing engine 110a, which is connected to packet processing engine 110e. Prior to transmission, packet processing engine 110a modifies the tuple by right-shifting its 12 bits by 4 bit-positions (and inserting 1s from the left to indicate no value from 0 to 7). Accordingly, the tuple now has value [15, 15, 15] when packet 200 is received by packet processing engine 110e. Upon receiving modified packet 200, packet processing engine 110e may be configured to determine whether the one or more destination port indicators 205 indicate that the destination of the received modified packet 200 is the current packet processing engine, here packet processing engine 110e. In particular, the value of destination port indicator 205c may now confirm that packet 200 has reached its destination. Packet processing engine 110e may be configured to process packet 200.

Note that the manner in which destination port indicators are modified corresponds to the manner in which destination port indicators indicate that a packet has reached its destination. For example, if a destination port indicator value of zero, i.e. "0000" on destination port indicator 205c, indicates that this packet has reached its destination, then the appropriate modification to a tuple of multiple destination port headers during routing of such packets would be to right-shift by 4 bit-positions and insert four zeroes from the left (e.g. from the most significant bit in this field). By way of illustration, a tuple may start, at the source of a particular packet, with binary value ["0100", "0010", "0101", "0001"] (or [4, 2, 5, 1]). This packet will then be transmitted, via port "0001" (or 1) to an intermediate packet processing engine, which will receive a modified packet having a tuple with binary value ["0000", "0100", "0010", "0101"] (or [0, 4, 2, 5]). This packet will then be transmitted, via port "0101" (or 5) to the next intermediate packet processing engine, which will receive the modified packet having a tuple with binary value ["0000", "0000", "0100", "0010"] (or [0, 0, 4, 2]). This packet will then be transmitted, via port "0010" (or 2) to the next intermediate packet processing engine, which will receive the modified packet having a tuple with binary value ["0000", "0000", "0000", "0100"] (or [0, 0, 0, 4]). This packet will then be transmitted, via port "0100" (or 4) to the next packet processing engine, which will receive the modified packet having a tuple with binary value ["0000", "0000", "0000", "0000"] (or [0, 0, 0, 0]). At this point the packet has reached its destination (e.g. the destination packet processing engine), and may thus be processed and/or consumed.

It should be noted that return routing may be unrelated to routing as previously described. In other words, while a particular tuple may guide a packet from one packet processing engine to another, the reverse routing may be different. For example, while tuple [15, 7, 7] guides a packet from packet processing engine 110d to 110e, the reverse routing would be accomplished using, e.g., tuple [15, 3, 5].

If, for any reason, packet processing engine 110a is (deemed to be) unable to perform routing activities with sufficient performance (e.g. speed and/or throughput), system 100 may adapt to find an alternative route to the destination of packet 200. For example, a packet may be routed from packet processing engine 110d to 110e via intermediate packet processing engines 110c and 110b by using tuple [7, 7, 4] and thus via connections 111e, 111c, and 111f in sequence. The reverse routing would be accomplished using, e.g., tuple [1, 4, 2]. In some implementations, problems with routing through, e.g., packet processing engine 110a may occur and be determined dynamically during use of system 100. For example, a particular packet processing engine may become a bottleneck for system performance if too many packet (e.g. an unbalanced load) are routed through the same packet processing engine.

If, for any reason, system 100 would need to be replaced with and/or duplicated by a new system, port-by-port routing as described herein would operate in the same manner, without a need for re-programming software and/or hardware that governs the routing. By virtue of the disclosure described herein, addressing within system 100 (and, in particular, software for system 100) may be highly portable, relocatable, and/or otherwise flexible. For example, defragmenting memory by moving processes and/or programs elsewhere within memory may be supported with ease. Port-by-port routing may provide flexibility in the layout of a chip, board, rack, blade, and/or chassis by virtue of supporting more than one route to most, if not all, destinations.

Figure 2:
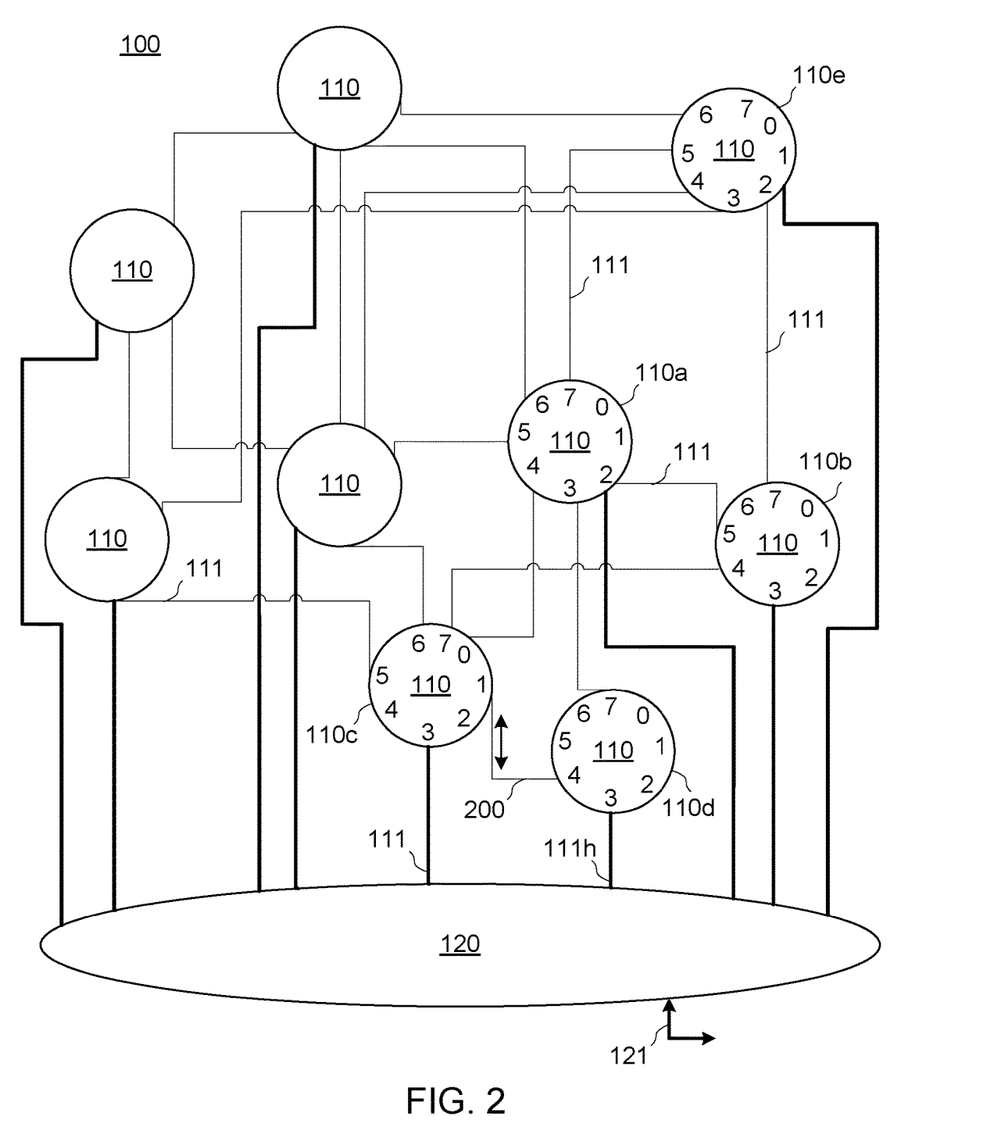
FIG. 2 illustrates a routing system in accordance with one or more embodiments.

System 100 may include one or more routers 120. For example, FIG. 2 illustrates a routing system 100 that includes a router 120. Router 120 may be configured to receive and/or transmit packets of information. Router 120 may support one or more modes of operation to route a particular packet. Routing modes and/or routing schemes may include port-by-port routing, (relative or absolute) address-based routing, and/or other types of routing. Packet headers may include an address-mode indicator to indicate which mode of operation is to be used to route a particular packet.

In some implementations, system 100 may use port-by-port routing in case a destination is within system 100, and address-based routing in case a destination is external to system 100. External destinations may be reached via router 120. For example, router 120 may include one or more connections to external interface 121. Router 120 may be configured to provide communication to off-chip systems, device, modules, and/or components. Router 120 may be configured to provide a serial link, including but not limited to a high-speed serial (HSS) link. In some embodiments, router 120 may be configured to provide the physical layer of the Open Systems Interconnect (OSI) model, also referred to as PHY. In some embodiments, router 120 may be configured to provide error-detection, error-correction, encryption, and/or other support functions commonly used when digital systems, devices, modules, and/or components interconnect and/or communicate. By way of non-limiting example, router 120 may be configured to support a cyclic redundancy check (CRC) on information and/or information being transferred.

By virtue of having a dedicated port and connection to router 120, packet processing engines may be configured to determine, e.g. by inspecting the address-mode indicator in the header of a packet, whether to transmit a packet to router 120. In other words, individual packet processing engines may not need to support address-based routing, other than to transmit packets to router 120 for address resolution.

In some implementations, after inspecting the address-mode indicator in the header of a packet, a packet processing engine may be configured to resolve to which port to send the packet. Such address resolution may be implemented using a (look-up) table, which may need merely 1 entry. For example, different packet processing engines may use different ports, if any, to connect to router 120. In other implementations, packet processing engines may use the same port to connect to router 120.

Note that other implementations, including ones that use combinations of multiple systems that are similar to or the same as system 100 are envisioned. Such implementations may employ different rules and/or heuristics to determine which mode of operation is to be used to route from a particular source to a particular destination. Individual packet processing engines may be configured to transmit packets to the nearest router if the address-mode indicator indicates address-based routing. In some implementations, packet processing engines may not need to support address resolution for address-based routing.

To support port-by-port routing, router 120 may be configured to enumerate one or more ports and/or assign values to one or more ports that correspond to the values of destination port indicator(s) 205.

Router 120 may include one or more address tables. Router 120 may be configured to determine destinations for packets based on one or more address tables and/or information in the packet. For example, a destination may be determined based on an address in a packet header. In some implementations, a destination may be determined based on one or more comparisons between entries in an address table and an address included in a packet. Router 120 may be configured to support address resolution through a look-up operation for one or more address tables.

In some implementations, system 100 may be configured such that all or most of packet processing engines 110 include a port that has a connection to router 120. This port may be one of the previously described (8) ports or it may be a separate and dedicated additional port. For example, the port for individual packet processing engines that connects an individual packet processing engine to router 120 may be indicated using the same value for destination port indicator 205. By way of non-limiting example, a value of 0 may indicate the port connected to router 120, values between 1 and 8 may indicate the ports connected to other packet processing engines, and values between 9 and 15 may indicate that a particular packet has reached its destination. Other encodings to distinguish between different modes of routing, between the port connected to router 120 and other ports, and/or between intermediate packet processing engine and the destination packet processing engines are envisioned and contemplated within the scope of this disclosure.

To illustrate the use of multiple modes of operation for routing a packet, i.e. multiple routing modes, assume that packet processing engine 110*d* has received a packet 200, wherein packet 200 is similar to the packet depicted in FIG. 1. Packet 200 includes, in header 201, an address-mode indicator 203. Assume that a value of 0 for address-mode indicator 203 indicates port-by-port routing, and a value of 1 indicates address-based routing. Packet processing engine 110*d* may be configured to determine, e.g. by inspecting address-mode indicator 203, which mode of routing to use for packet 200. In case of port-by-port routing, operation proceeds in a manner similar to the previously described manner for other examples. In case of address-based routing, which may be referred to as long-distance routing in some implementations, packet processing engine 110*d* may be configured to transmit packet 200, via connection 111*h*, to router 120. In some implementations, packet processing engine 110*d* may be configured to use a predetermined port to forward "long distance" packets to. Subsequently, router 120 may be configured to determine, through address resolution and/or based on address 204 of packet 200, where to route packet 200.

In some implementations, router 120 may be similar to or the same as the on-chip processing system (e.g. "system 100") described in the '558 application.

Figure 3:
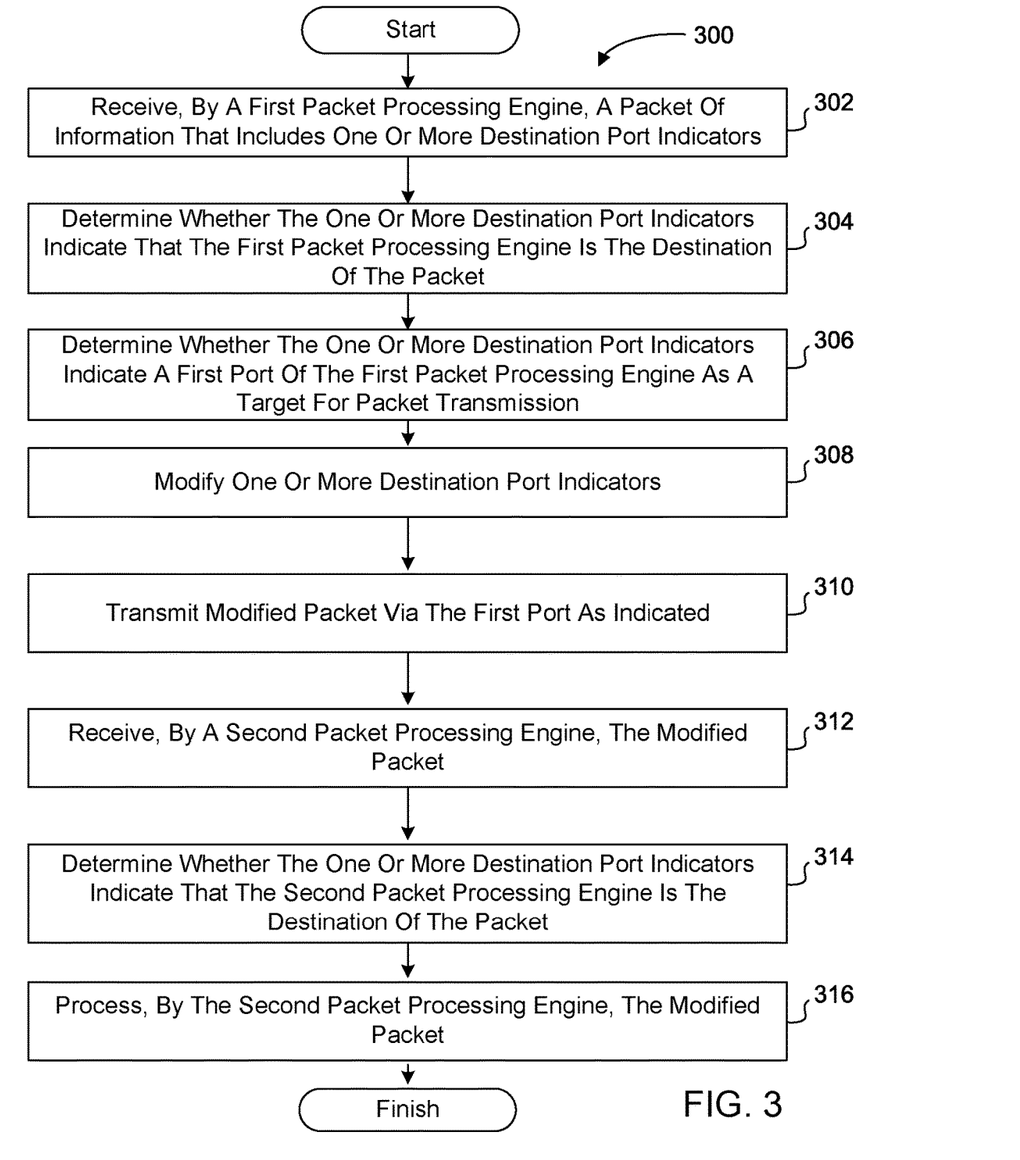
FIGS. 3-5 illustrate methods to processing packets of information using an on-chip processing system in accordance with one or more embodiments.
Figure 4:
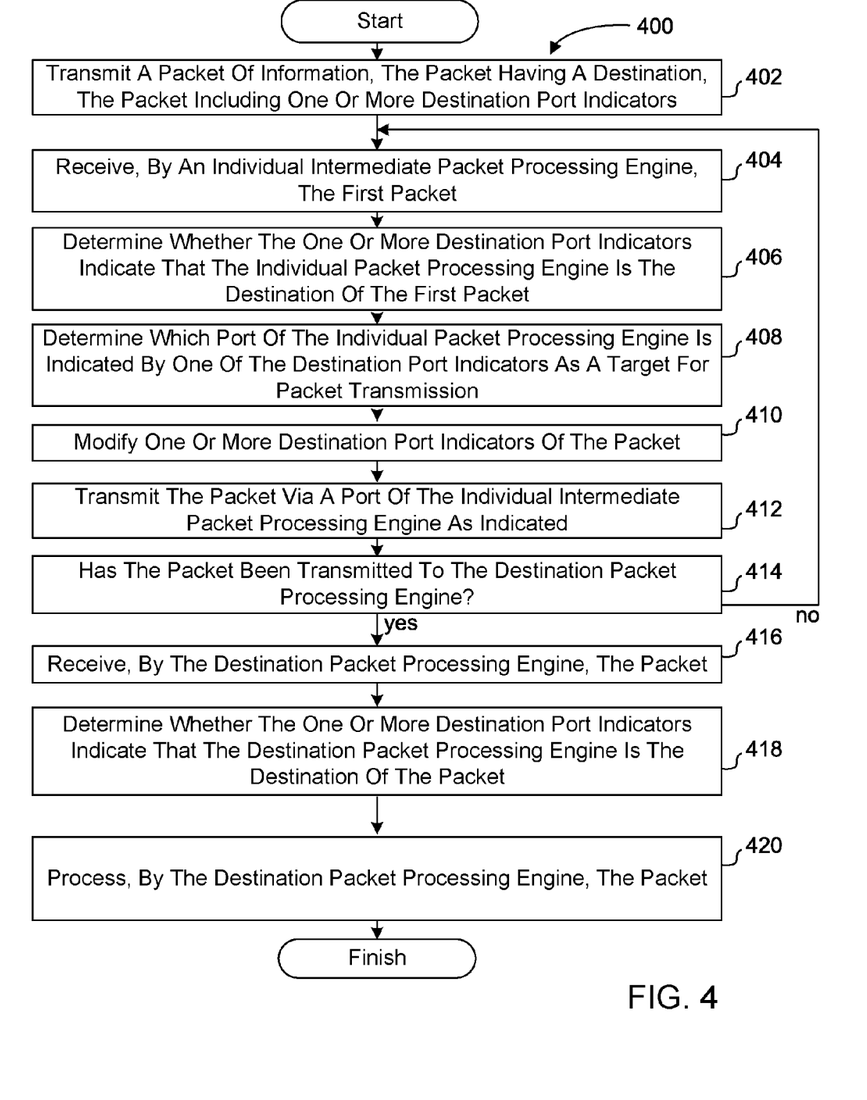
Figure 5:
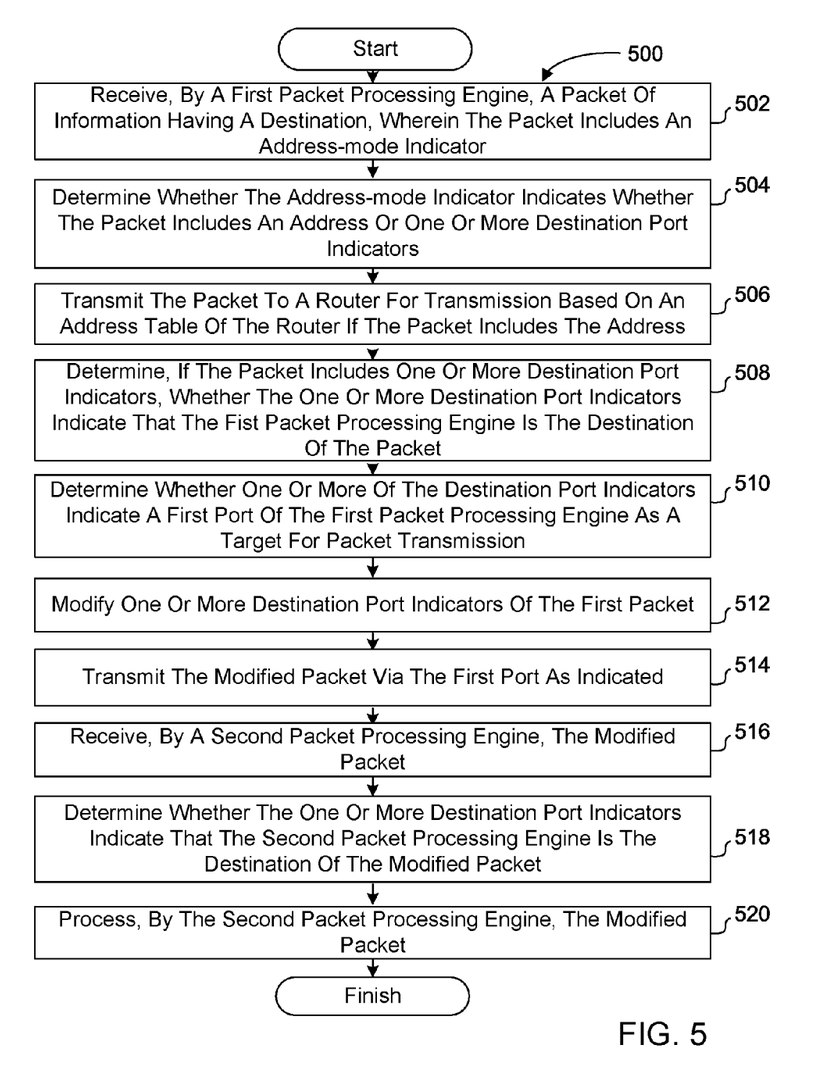

FIGS. 3-5 illustrate method 300, 400, and 500 of routing packets of information. The operations of methods 300, 400, and 500 presented below are intended to be illustrative. In some implementations, methods 300, 400, and 500 may be accomplished with one or more additional operations not described, and/or without one or more of the operations discussed. Additionally, the order in which the operations of methods 300, 400, and 500 are illustrated in FIGS. 3-5 and described below is not intended to be limiting.

In some embodiments, methods 300, 400, and 500 may be implemented in one or more processing systems (e.g. system 100 as depicted in FIG. 1), processing devices (e.g., a digital processor, an analog processor, a digital circuit designed to process information, an analog circuit designed to process information, and/or other mechanisms for electronically processing information). The one or more processing devices may include one or more devices executing some or all of the operations of methods 300, 400, and 500 in response to instructions stored electronically on an electronic storage medium. The one or more processing devices may include one or more devices configured through hardware, firmware, and/or software to be specifically designed for execution of one or more of the operations of methods 300, 400, and 500.

At an operation 302, a first packet of information is received by a first packet processing engine. Method 300 may be implemented in a system that includes a set of packet processing engines. Individual packet processing engines may include multiple ports. The system may include a network of connections between ports of individual packet processing engines. The first packet has a destination. The first packet includes one or more destination port indicators. In some embodiments, operation 302 is performed by a packet processing engine the same as or similar to packet processing engine 110*a* (shown in FIG. 1 and described herein).

At an operation 304, it is determined whether the one or more destination port indicators included in the first packet indicate that the receiving engine is the destination of the first packet. In some embodiments, operation 304 is performed by a packet processing engine the same as or similar to packet processing engine 110*a* (shown in FIG. 1 and described herein).

At an operation 306, responsive to the determination that the receiving engine is not the destination of the first packet, it is determined whether one of the destination port indicators included in the first packet indicate the first port of the receiving engine as a target for packet transmission. In some embodiments, operation 306 is performed by a packet processing engine the same as or similar to packet processing engine 110*a* (shown in FIG. 1 and described herein).

At an operation 308, responsive to the determination that one of the destination port indicators indicates the first port for packet transmission, one or more destination port indicators of the first packet is modified. In some embodiments, operation 308 is performed by a packet processing engine the same as or similar to packet processing engine 110*a* (shown in FIG. 1 and described herein).

At an operation 310, the modified first packet is transmitted via the first port and via a connection between two packet processing engines as indicated. In some embodiments, operation 310 is performed by a packet processing engine the same as or similar to packet processing engine 110*a* (shown in FIG. 1 and described herein).

At an operation 312, the modified packet of information is received by a second packet processing engine. In some embodiments, operation 312 is performed by a packet processing engine the same as or similar to packet processing engine 110*b* (shown in FIG. 1 and described herein).

At an operation 314, it is determined whether the one or more destination port indicators included in the modified first packet indicate that the second packet processing engine is the destination of the modified first packet. In some embodiments, operation 314 is performed by a packet processing engine the same as or similar to packet processing engine 110b (shown in FIG. 1 and described herein).

At an operation 316, responsive to the determination that the second packet processing engine is the destination of the modified first packet, the modified first packet is processed. In some embodiments, operation 316 is performed by a packet processing engine the same as or similar to packet processing engine 110b (shown in FIG. 1 and described herein).

Referring to method 400, at an operation 402, a first packet of information is transmitted by a source packet processing engine. Method 400 may be implemented in a system that includes a set of packet processing engines, including the source packet processing engine, one or more intermediate packet processing engines, and a destination packet processing engine. The first packet has a destination. The destination may be referred to as the destination packet processing engine. Individual packet processing engines may have multiple ports. The system may include a network of connections between ports of individual packet processing engines. The first packet includes one or more destination port indicators. In some embodiments, operation 402 is performed by a packet processing engine the same as or similar to packet processing engine 110a (shown in FIG. 1 and described herein).

At an operation 404, the first packet is received by an individual intermediate packet processing engine. In some embodiments, operation 404 is performed by a packet processing engine the same as or similar to packet processing engine 110b (shown in FIG. 1 and described herein).

At an operation 406, it is determined whether the one or more destination port indicators included in the first packet indicate that the individual intermediate engine is the destination of the first packet. In some embodiments, operation 406 is performed by a packet processing engine the same as or similar to packet processing engine 110b (shown in FIG. 1 and described herein).

At an operation 408, responsive to the determination that an individual intermediate engine is not the destination of the first packet, it is determined which port of the individual engine is indicated by one of the destination port indicators as a target for packet transmission. In some embodiments, operation 408 is performed by a packet processing engine the same as or similar to packet processing engine 110b (shown in FIG. 1 and described herein).

At an operation 410, responsive to the determination which port of the individual engine is indicated as the target for packet transmission, one or more destination port indicators of the first packet is modified. In some embodiments, operation 410 is performed by a packet processing engine the same as or similar to packet processing engine 110b (shown in FIG. 1 and described herein).

At an operation 412, the first packet is transmitted via a port of an individual intermediate engine as indicated. In some embodiments, operation 412 is performed by a packet processing engine the same as or similar to packet processing engine 110b (shown in FIG. 1 and described herein).

At an operation 414, it is determined whether the first packet has been transmitted to a destination packet processing engine. For example, the destination packet processing engine may be packet processing engine 110d of FIG. 1. If not, operation of method 400 continues at operation 404 (for different individual intermediate packet processing engines, e.g. including packet processing engine 110c) until the first packet has been transmitted to the destination packet processing engine. Else, operation of method 400 continues at operation 416. In some embodiments, operation 414 is performed by a packet processing engine the same as or similar to packet processing engine 110c or 110d (shown in FIG. 1 and described herein).

At an operation 416, the first packet is received by the destination packet processing engine. In some embodiments, operation 416 is performed by a packet processing engine the same as or similar to packet processing engine 110d (shown in FIG. 1 and described herein).

At an operation 418, it is determined whether the one or more destination port indicators included in the first packet indicate that the receiving packet processing engine is the destination of the first packet. In some embodiments, operation 418 is performed by a packet processing engine the same as or similar to packet processing engine 110d (shown in FIG. 1 and described herein).

At an operation 420, responsive to the determination that the receiving packet processing engine is the destination of the first packet, the first packet is processed. In some embodiments, operation 420 is performed by a packet processing engine the same as or similar to packet processing engine 110d (shown in FIG. 1 and described herein).

Referring to method 500, at an operation 502, a first packet of information is received by a first packet processing engine. Method 500 may be implemented in a system that includes a router comprising one or more address tables, a set of packet processing engines, including a first and second packet processing engine. The first packet has a destination. The destination may be referred to as a destination packet processing engine. Individual packet processing engines may have multiple ports. The system may include a network of connections between ports of individual packet processing engines. The first packet includes an address-mode indicator. In some embodiments, operation 502 is performed by a packet processing engine the same as or similar to packet processing engine 110a (shown in FIG. 1 and described herein).

At an operation 504, it is determined whether the address-mode indicator indicates whether the first packet includes a first address or one or more destination port indicators. In some embodiments, operation 504 is performed by a packet processing engine the same as or similar to packet processing engine 110a (shown in FIG. 1 and described herein).

At an operation 506, the first packet is transmitted to the router for transmission based on the address table of the router, responsive to the determination that the first packet includes the first address. In some embodiments, operation 506 is performed by a packet processing engine the same as or similar to packet processing engine 110a (shown in FIG. 1 and described herein).

At an operation 508, responsive to the determination that the first packet includes one or more destination port indicators, it is determined whether the one or more destination port indicators included in the first packet indicate that the first packet processing engine is the destination of the first packet. In some embodiments, operation 508 is performed by a packet processing engine the same as or similar to packet processing engine 110a (shown in FIG. 1 and described herein).

At an operation 510, responsive to the determination that the first engine is not the destination of the first packet, it is determined whether one of the destination port indicators included in the first packet indicates the first port of the first packet processing engine as a target for packet transmission. In some embodiments, operation 510 is performed by a packet processing engine the same as or similar to packet processing engine 110a (shown in FIG. 1 and described herein).

At an operation 512, responsive to the determination that one of the destination port indicators indicates the first port of the first packet processing engine for packet transmission, one or more destination port indicators of the first packet are modified. In some embodiments, operation 512 is performed by a packet processing engine the same as or similar to packet processing engine 110a (shown in FIG. 1 and described herein).

At an operation 514, the modified first packet is transmitted via the first port as indicated. In some embodiments, operation 514 is performed by a packet processing engine the same as or similar to packet processing engine 110a (shown in FIG. 1 and described herein).

At an operation 516, the modified packet of information is received by a second packet processing engine. In some embodiments, operation 516 is performed by a packet processing engine the same as or similar to packet processing engine 110b (shown in FIG. 1 and described herein).

At an operation 518, it is determined whether the one or more destination port indicators included in the modified first packet indicate that the second packet processing engine is the destination of the modified first packet. In some embodiments, operation 518 is performed by a packet processing engine the same as or similar to packet processing engine 110b (shown in FIG. 1 and described herein).

At an operation 520, responsive to the determination that the second packet processing engine is the destination of the modified first packet, the modified first packet is processed. In some embodiments, operation 520 is performed by a packet processing engine the same as or similar to packet processing engine 110b (shown in FIG. 1 and described herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method implemented by a first packet processing engine comprising a plurality of ports, the method comprising:

receiving a packet at the first packet processing engine, the packet including a payload and a first plurality of destination port indicators, the first plurality of destination port indicators being encoded using multiple bits in a field in included in the packet and comprising a first destination port indicator and a second destination port indicator;

determining to transmit the packet to another packet processing engine using the first destination port indicator;

determining that a first port of the plurality of ports corresponds to the first destination port indicator;

modifying the first plurality of destination port indicators of the packet to remove the first destination port indicator and create a modified packet such that the modified packet comprises the second destination port indicator, wherein the modifying is accomplished by bit-shifting the field; and transmitting the modified packet via the first port to a second packet processing engine.

2. The method of claim 1, wherein the first packet processing engine is directly connected to the second packet processing engine via the first port of the first packet processing engine and a second port of the second packet processing engine.

3. The method of claim 1, wherein each port of the plurality of ports is connected to a packet processing engine of a plurality of packet processing engines.

4. The method of claim 1, wherein the first port of the first packet processing engine is configured to form a point-to-point connection with a second port of the second packet processing engine.

5. The method of claim 1, wherein the packet includes a packet header, and the packet header includes the first plurality of destination port indicators.

6. The method of claim 1, further comprising:

receiving, by the second packet processing engine, the modified packet, the modified packet comprising a second plurality of destination port indicators that includes the second destination port indicator, and the second packet processing engine comprising a second plurality of ports;

determining to transmit the modified packet to another packet processing engine using the second destination port indicator;

determining that a second port of the second plurality of ports corresponds to the second destination port indicator;

modifying the second plurality of destination port indicators of the modified packet to remove the second destination port indicator and create a second modified packet; and transmitting the second modified packet via the second port to a third packet processing engine.

7. The method of claim 1, further comprising:

receiving, by the second packet processing engine, the modified packet, the modified packet comprising the second destination port indicator;

determining that the second packet processing engine is a destination of the modified packet using the second destination port indicator; and processing the modified packet.

8. A system comprising:

a set of packet processing engines configured to receive, transmit, and/or process packets of information, wherein individual ones of the set of packet processing engines include a plurality of ports, and the set of packet processing engines includes a first packet processing engine configured to:

receive a packet including a payload and a first plurality of destination port indicators, the first plurality of destination port indicators being encoded using multiple bits in a field included in the packet and comprising a first destination port indicator and a second destination port indicator;

determine to transmit the packet to another packet processing engine of the set of packet processing engines using the first destination port indicator;

determine that a first port of the plurality of ports corresponds to the first destination port indicator;

modify the first plurality of destination port indicators of the packet to remove the first destination port indicator and create a modified packet such that the modified packet comprises the second destination port indicator, wherein the modifying is accomplished by bit-shifting the field; and transmit the modified packet via the first port to a second packet processing engine of the set of packet processing engines.

9. The system of claim 8, wherein the first packet processing engine is directly connected to the second packet processing engine via the first port of the first packet processing engine and a second port of the second packet processing engine.

10. The system of claim 1, wherein each port of the plurality of ports is connected to a packet processing engine of the set of packet processing engines.

11. The system of claim 8, wherein the first port of the first packet processing engine is configured to form a point-to-point connection with a second port of the second packet processing engine.

12. The system of claim 8, wherein the packet includes a packet header, and the packet header includes the first plurality of destination port indicators.

13. The system of claim 8, wherein the second packet processing engine is further configured to:

receive the modified packet, the modified packet comprising a second plurality of destination port indicators that includes the second destination port indicator;

determine to transmit the modified packet to another packet processing engine of the set of packet processing engines using the second destination port indicator;

determine that a second port of the second plurality of destination port indicators of the second packet processing engine corresponds to the second destination port indicator;

modify the second plurality of destination port indicators of the modified packet to remove the second destination port indicator and create a second modified packet; and transmit the second modified packet via the second port to a third packet processing engine of the set of packet processing engines.

14. The system of claim 8, wherein the second packet processing engine is further configured to:

receive the modified packet that comprises the second destination port indicator;

determine that the second packet processing engine is a destination of the modified packet using the second destination port indicator; and process the modified packet.

15. A method to route packets, comprising:

receiving, by a first packet processing engine of a set of packet processing engines, a first packet, the first packet having a first address-mode indicator;

determining that the first address-mode indicator indicates that the first packet includes a first destination address;

transmitting the first packet to a router for transmission based on an address table;

receiving, by the first packet processing engine, a second packet, the second packet having a second address-mode indicator;

determining that the second address-mode indicator indicates that the second packet includes a plurality of destination port indicators, the plurality of destination port indicators comprising a first destination port indicator and a second destination port indicator forming a tuple;

determining that a first port of the first packet processing engine corresponds to the first destination port indicator;

modifying the plurality of destination port indicators of the second packet to remove the first destination port indicator and create a modified packet, the modified packet including the second destination port indicator, wherein the modifying is accomplished by bit-shifting the tuple; and transmitting the modified packet via the first port to a second packet processing engine of the set of packet processing engines.

16. A method implemented by a first packet processing engine comprising a plurality of ports, the method comprising:

receiving a packet at the first packet processing engine, the packet including a payload and a first plurality of destination port indicators, the first plurality of destination port indicators comprising a first destination port indicator and a second destination port indicator forming a tuple;

determining to transmit the packet to another packet processing engine using the first destination port indicator;

determining that a first port of the plurality of ports corresponds to the first destination port indicator;

modifying the first plurality of destination port indicators of the packet to remove the first destination port indicator and create a modified packet such that the modified packet comprises the second destination port indicator, wherein the modifying is accomplished by bit-shifting the tuple in a direction to shift off, in a first end of the tuple, the first destination port indicator, and add zeros to the tuple in a second end of the tuple; and transmitting the modified packet via the first port to a second packet processing engine.

17. A system comprising:

a set of packet processing engines configured to receive, transmit, and/or process packets of information, wherein individual ones of the set of packet processing engines include a plurality of ports, and the set of packet processing engines includes a first packet processing engine configured to:

receive a packet including a payload and a first plurality of destination port indicators, the first plurality of destination port indicators comprising a first destination port indicator and a second destination port indicator forming a tuple;

determine to transmit the packet to another packet processing engine of the set of packet processing engines using the first destination port indicator;

determine that a first port of the plurality of ports corresponds to the first destination port indicator;

modify the first plurality of destination port indicators of the packet to remove the first destination port indicator and create a modified packet such that the modified packet comprises the second destination port indicator, wherein the modifying is accomplished by bit-shifting the tuple in a direction to shift off, in a first end of the tuple, the first destination port indicator, and add zeros to the tuple in a second end of the tuple; and transmit the modified packet via the first port to a second packet processing engine of the set of packet processing engines.

\* \* \* \* \*

UNITED STATES PATENT AND TRADEMARK OFFICE
CERTIFICATE OF CORRECTION

PATENT NO. : 10,404,587 B2
APPLICATION NO. : 15/131445
DATED : September 3, 2019
INVENTOR(S) : Douglas A. Palmer

Page 1 of 1

It is certified that error appears in the above-identified patent and that said Letters Patent is hereby corrected as shown below:

In the Claims

Column 17, Line 15 (Claim 10), should read as follows:
-- 10. The system of claim 8, wherein each port of the --.

Signed and Sealed this
Twenty-ninth Day of October, 2019

Andrei Iancu
*Director of the United States Patent and Trademark Office*